United States Patent

Ogasawara

(10) Patent No.: US 9,505,338 B2
(45) Date of Patent: Nov. 29, 2016

(54) VEHICLE DRIVING ENVIRONMENT RECOGNITION APPARATUS

(71) Applicant: Fuji Jukogyo Kabushiki Kaisha, Tokyo (JP)

(72) Inventor: Toyokazu Ogasawara, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 753 days.

(21) Appl. No.: 13/744,307

(22) Filed: Jan. 17, 2013

(65) Prior Publication Data

US 2013/0182111 A1 Jul. 18, 2013

(30) Foreign Application Priority Data

Jan. 18, 2012 (JP) .................. 2012-008347

(51) Int. Cl.
| | |
|---|---|
| *B60Q 1/00* | (2006.01) |
| *H04N 7/18* | (2006.01) |
| *H04N 5/235* | (2006.01) |
| *B60Q 1/14* | (2006.01) |
| *G06K 9/00* | (2006.01) |
| *H04N 5/232* | (2006.01) |

(52) U.S. Cl.
CPC ................. *B60Q 1/00* (2013.01); *B60Q 1/143* (2013.01); *G06K 9/00805* (2013.01); *G06K 9/00825* (2013.01); *H04N 5/2353* (2013.01); *H04N 7/18* (2013.01); *B60Q 2300/42* (2013.01); *H04N 5/23245* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 7,733,464 | B2 * | 6/2010 | David .................. | G01S 7/484 356/5.03 |
| 2005/0036660 | A1 * | 2/2005 | Otsuka ................ | B60Q 1/1423 382/104 |
| 2005/0258370 | A1 * | 11/2005 | Kawamura ............. | B60R 1/00 250/370.08 |
| 2007/0222877 | A1 * | 9/2007 | Kurane ................ | H04N 3/1562 348/294 |
| 2008/0205705 | A1 * | 8/2008 | Kashimura ............ | B60Q 1/1423 382/104 |
| 2008/0239076 | A1 * | 10/2008 | Luo ................... | G06K 9/00798 348/148 |
| 2012/0050074 | A1 * | 3/2012 | Bechtel ............... | B60R 1/04 340/988 |

(Continued)

FOREIGN PATENT DOCUMENTS

| | | |
|---|---|---|
| JP | 2005-092857 A | 4/2005 |
| JP | 2008-207677 A | 9/2008 |
| JP | 2008-262467 A | 10/2008 |

*Primary Examiner* — Rami Khatib
*Assistant Examiner* — Jeffrey Boomer
(74) *Attorney, Agent, or Firm* — McDermott Will and Emery LLP

(57) ABSTRACT

There is provided a vehicle driving environment recognition apparatus. When an onboard camera does not recognize a vehicle ahead during when a vehicle runs at night, an exposure amount of the onboard camera is set to a first exposure amount mode. When the vehicle ahead is not recognized, or only a light source of an oncoming vehicle is recognized, the exposure amount of the onboard camera is set to a second exposure amount mode. In the first exposure amount mode, a low-luminance detection exposure amount and a high-luminance detection exposure amount are alternately switched for each frame, and an image is captured with the switched exposure amount. In the second exposure amount mode, the exposure amount is fixed to the low-luminance detection exposure amount.

8 Claims, 5 Drawing Sheets

(56) References Cited

U.S. PATENT DOCUMENTS

| | | | |
|---|---|---|---|
| 2012/0300074 A1* | 11/2012 | Hasegawa | H04N 5/235 348/148 |
| 2014/0029008 A1* | 1/2014 | Hirai | G01N 21/552 356/445 |
| 2014/0313316 A1* | 10/2014 | Olsson | H04N 7/183 348/84 |
| 2015/0086079 A1* | 3/2015 | Murao | G06K 9/00791 382/104 |
| 2016/0048734 A1* | 2/2016 | Lee | G06K 9/00825 348/148 |
| 2016/0234444 A1* | 8/2016 | Hosono | G03B 7/091 |

* cited by examiner

*FIG. 6*

| CONDITION | | CONTENT OF CONTROL | |
|---|---|---|---|
| VEHICLE AHEAD | LIGHT SOURCE (ONCOMING VEHICLE) | HEADLIGHT | EXPOSURE AMOUNT |
| NOT PRESENT | NOT PRESENT | Hi | LARGE⇔SMALL |
| NOT PRESENT | PRESENT | Lo | LARGE⇔SMALL |
| PRESENT | | Lo | LARGE |

VEHICLE DRIVING ENVIRONMENT RECOGNITION APPARATUS

CROSS-REFERENCE TO RELATED APPLICATIONS

The present application claims priority from Japanese Patent Application No. 2012-008347 filed on Jan. 18, 2012, the entire contents of which are hereby incorporated by reference.

BACKGROUND OF THE INVENTION

1. Field of the Invention

The present invention relates to a vehicle driving environment recognition apparatus that is capable of precisely capturing driving environment in front of a vehicle with an onboard camera, when the vehicle runs at night.

2. Description of Related Art

There has conventionally been known a technique of capturing a surrounding driving environment by an onboard camera, detecting an three-dimensional object such as a pedestrian, a vehicle ahead, or a traffic light, or a lighting color of the traffic light, from the captured driving environment, and utilizing the detected result for an adaptive cruise control (ACC) or a collision prevention control (pre-crash control).

In this case, when a vehicle runs at night, a recognition target such as a road sign, a white line and pedestrian cannot be recognized by a reflection of sunlight unlike the case when the vehicle runs in the daytime. Therefore, the onboard camera recognizes a recognition target by a reflection light of an irradiation from a headlight of the vehicle, or detects a light source such as a lighting taillight of a vehicle ahead, an oncoming headlight, or a traffic light, in order to detect a distance between the vehicle and the recognition target or the light source. For this, there has also been a technique of executing a light distribution control in which a headlight is generally set as high beam, and changed to low beam when the onboard camera recognizes an oncoming vehicle.

An exposure amount is set to be large in most cases, since an amount of light incident on the onboard camera is decreased during a drive at night. However, when the exposure amount of the onboard camera is set to be large, a light quantity from a light source, such as a lighting headlight of an oncoming vehicle, or a traffic light, is too strong, and thus a blooming might occur. On the other hand, when the exposure amount is set to be smaller, it is difficult to recognize a recognition target that does not emit light.

Japanese Unexamined Patent Application Publication No. 2005-92857 describes a technique to solve this problem. The technique analyzes an image that is captured by changing an exposure amount to a high-luminance detection exposure amount and to a low-luminance detection exposure amount, so as to detect a light source such as a taillight of a vehicle running far ahead, or a lighting headlight of an approaching oncoming vehicle. The technique then obtains a width of the vehicle of interest from the distance between left and right light sources (headlight or taillight) displayed on the imaging surface of the onboard camera, thereby obtaining the distance between the vehicle ahead or oncoming vehicle and the vehicle based upon the width of the vehicle on the image and a focal distance of the onboard camera.

In the technique described in the above-mentioned publication, the distance between the left and right headlights or the left and right taillights, displayed on the imaging surface of the camera has to be calculated first in order to obtain the distance between the vehicle ahead or the oncoming vehicle and the vehicle.

However, since the light sources look on the image look different between the case of using the high-luminance detection exposure amount and the case of using the low-luminance detection exposure amount, it is difficult to detect the center of the headlights or the center of the taillights. Therefore, the distance between the left and right headlights or the left and right taillights cannot precisely be detected. Accordingly, the distance between the vehicle ahead or the oncoming vehicle and the vehicle cannot precisely be obtained at all times.

In the technique described in the above-mentioned publication, the onboard camera always makes a changeover between the high-luminance detection exposure amount and the low-luminance detection exposure amount, regardless of the light distribution (high beam and low beam) of the headlight, and regardless of whether or not there is a vehicle ahead or oncoming vehicle. Therefore, the high-luminance detection exposure amount can be employed even under the environment where higher precision detection can be attained by using only the low-luminance detection exposure amount, for example. Accordingly, the precision of recognizing the driving environment at night is reduced, and further, it becomes difficult to precisely detect the distance between the recognition target and the vehicle.

BRIEF SUMMARY OF THE INVENTION

The present invention is accomplished in view of the foregoing circumstance, and aims to provide a vehicle driving environment recognition apparatus that enhances precision of recognizing driving environment at night based upon an image captured by an onboard camera, and that can precisely detect a distance between a vehicle and a recognition target.

An aspect of the present invention provides a vehicle driving environment recognition apparatus including: an onboard camera that is mounted on a vehicle for capturing an environment in front of the vehicle; an image recognition processing unit for acquiring the image captured by the onboard camera, recognizing at least a vehicle ahead, and setting a light distribution of a headlight and an exposure amount of the onboard camera according to the recognition state of the vehicle ahead; a light distribution controlling unit for operating the light distribution of the headlight based upon the light distribution set by the image recognition processing unit; and a camera controlling unit for adjusting the exposure amount of the onboard camera based upon the exposure amount set by the image recognition processing unit, wherein the image recognition processing unit selects a first exposure amount mode in which the exposure amount is switched among different exposure amounts, and a second exposure amount in which the exposure amount is fixed to a single exposure amount according to the recognition state of the vehicle ahead, and allows the camera controlling unit to expose with the selected exposure amount mode.

According to the present invention, the first exposure amount mode in which the exposure amount is switched among different exposure amounts, and the second exposure amount mode in which the exposure amount is fixed to a single exposure amount is selected according to the recognition state of the vehicle ahead based upon the image captured by the onboard camera. Therefore, when the vehicle ahead is not recognized, for example, the first exposure amount mode is selected, and when the vehicle ahead is recognized, the second exposure amount is selected. Accordingly, the recognition precision of recognizing the driving environment at night by the onboard camera can be enhanced, and the distance between the vehicle and the recognition target can precisely be detected.

BRIEF DESCRIPTION OF THE SEVERAL VIEWS OF THE DRAWINGS

FIG. 6 is an explanatory view illustrating a driving environment condition and the contents of a control.

DETAILED DESCRIPTION OF THE INVENTION

Figure 1:
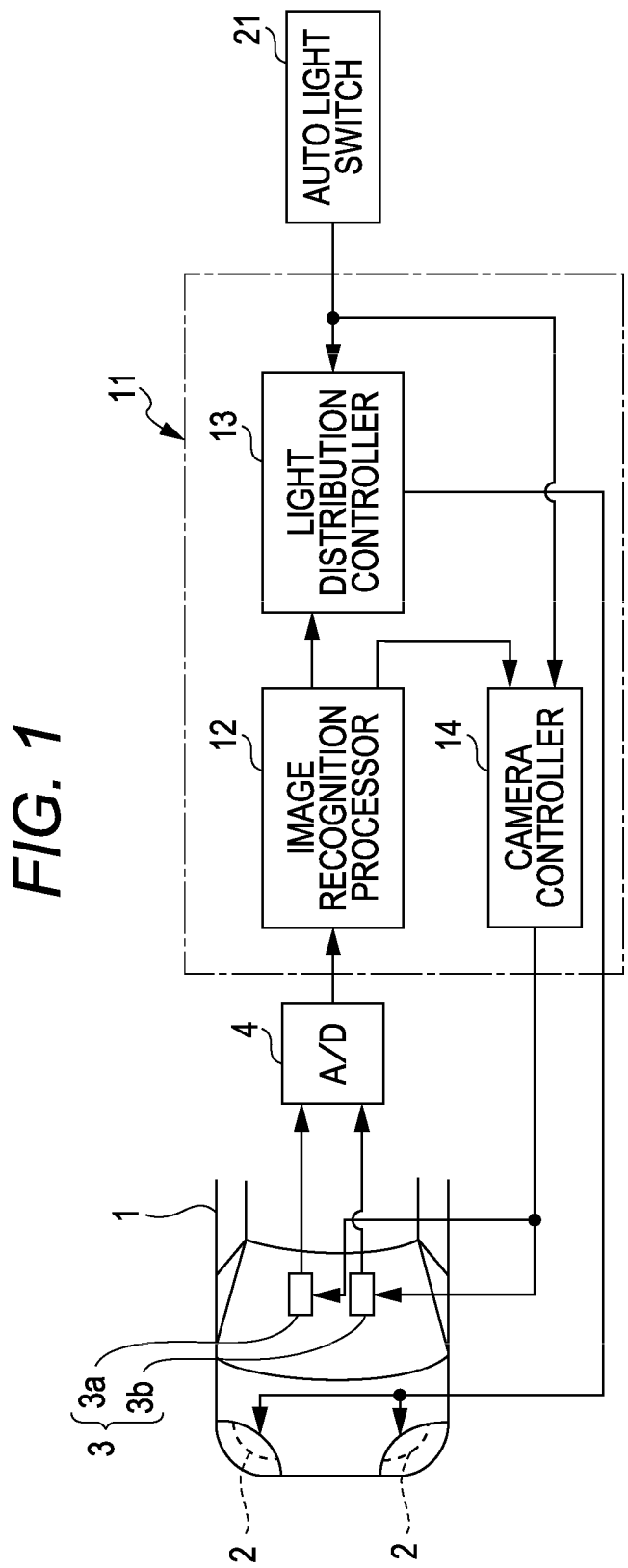
FIG. 1 is a diagram schematically illustrating a driving environment recognition apparatus.

One embodiment of the present invention will be described with reference to the drawings. Headlights 2 are provided on left and right front ends of a vehicle 1, such as an automobile, in FIG. 1, and an onboard camera 3 is mounted at a position that is the front part of a vehicle compartment and the upper part of a front window. The onboard camera 3 is a stereo camera including a main camera 3a and a sub-camera 3b. An image sensor such as CCD or CMOS is incorporated into each of the cameras 3a and 3b. The cameras 3a and 3b are disposed on positions symmetric with respect to an inside rear view mirror provided at the center in the widthwise direction of the vehicle.

The main camera 3a captures a reference image (right image) required for performing a stereo process, while the sub-camera 3b captures a comparison image (left image) for this process. Analog images of RGB synchronously output from the respective cameras 3a and 3b are converted into digital images with a predetermined grayscale by an A/D converter 4. The digital image is output to alight-distribution and exposure-amount control unit 11.

The light-distribution and exposure-amount control unit 11 mainly includes a microcomputer, and has a known CPU, ROM, and RAM. It also includes an image recognition processor 12 serving as an image recognition processing unit, a light distribution controller 13 serving as a light distribution controlling unit, and a camera controller 14 serving as a camera controlling unit. An ON/OFF signal from an auto light switch 21 is input to the light distribution controller 13 and the camera controller 14.

The image recognition processor 12 acquires an image captured by the onboard camera 3 for recognizing a three-dimensional recognition target, and a recognition target (hereinafter referred to as a "light source") that emits light. The three-dimensional object includes a vehicle ahead, an oncoming vehicle, a white light, a curb, a pedestrian, a road sign, and the like. The light source includes a traffic light, a street lamp, a taillight of a vehicle ahead, a headlight of an oncoming vehicle, and the like. The recognition target including the light source is recognized by using a known pattern matching process, for example.

The image recognition processor 12 also acquires a distance between each three-dimensional object as well as each light source and the vehicle 1 from a disparity between images of the same three-dimensional object and the same light source captured respectively from the main camera 3a and the sub-camera 3b. The way of acquiring the distance to the three-dimensional object is known, so that it will not be described here. The information of the object (vehicle ahead, oncoming vehicle, etc.) recognized by the image recognition processor 12 and distance information between the object and the vehicle 1 are read as parameters for executing an adaptive cruise control (ACC) or pre-crash control.

The image recognition processor 12 also checks whether or not there is a light source of a vehicle ahead or an oncoming vehicle within a predetermined range in front of the vehicle 1, and outputs a light distribution control signal indicating a high beam or low beam to the light distribution controller 13, and outputs an exposure amount control signal to the camera controller 14, according to the detected result (recognized condition).

The image recognition processor 12 includes a first exposure amount mode and a second exposure amount mode for the exposure amount control. In the first exposure amount mode, a storage time of the image sensor provided to the cameras 3a and 3b is adjusted to synchronously and alternately make a changeover between a low-luminance detection exposure amount (long exposure time) and a high-luminance detection exposure amount (short exposure time) for each frame of an image signal. In the second exposure amount mode, the exposure amount is fixed to the low-luminance exposure amount (long exposure time).

Specifically, when neither a vehicle ahead nor a light source of an oncoming vehicle is detected by the image recognition processor 12, or when only the light source of an oncoming vehicle is detected, the first exposure amount mode is selected in which the exposure amount is alternately changed between the low-luminance detection exposure amount and the high-luminance detection exposure amount. When a vehicle ahead is detected, the second exposure amount mode is selected in which the exposure amount (exposure time) is fixed to the low-luminance exposure amount. The low-luminance exposure amount is set to be the exposure time optimum for detecting a three-dimensional object that does not emit light, such as a vehicle ahead, a white line, a curb, a pedestrian, a roadside recognition target, a road sign, and the like. On the other hand, the high-luminance detection exposure amount is set to be the exposure time optimum for detecting the above-mentioned light source.

Figure 5A:
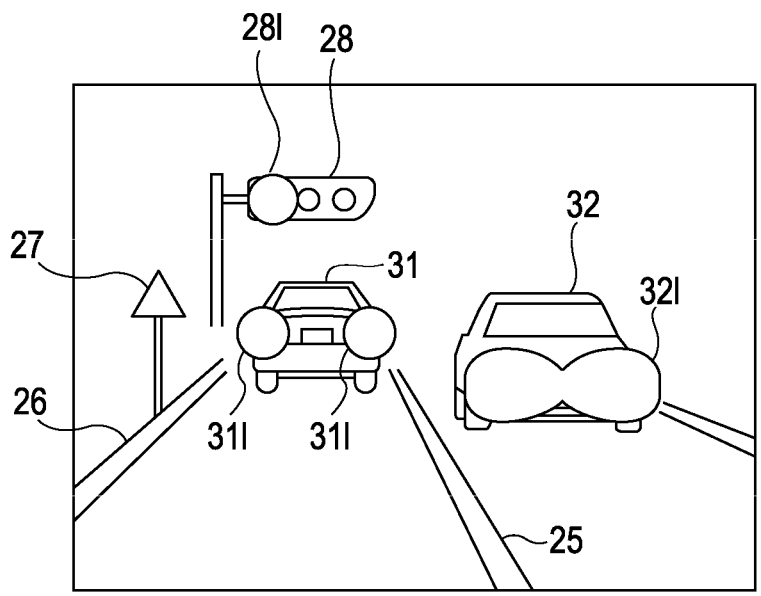
FIG. 5A is an explanatory view of an image captured with a low-luminance detection exposure amount.

As illustrated in FIG. 5A, when the exposure time is adjusted to be the low-luminance detection exposure amount (long exposure time), a recognition target, such as a white line 25 and a curb 26 of the road, a road sign 27, a traffic light 28, a vehicle ahead 31, or an oncoming vehicle 32, is recognized. However, the low-luminance detection exposure amount causes a blooming against the light source such as a light (lighting light) 281 of a lighting lamp 28a of the traffic light 28, a light (taillight light) 311 of the taillight 31a of the vehicle ahead 31, or a light (headlight light) 321 of the headlight 32a of the oncoming vehicle 32, since such light source has high light intensity.

Figure 5B:
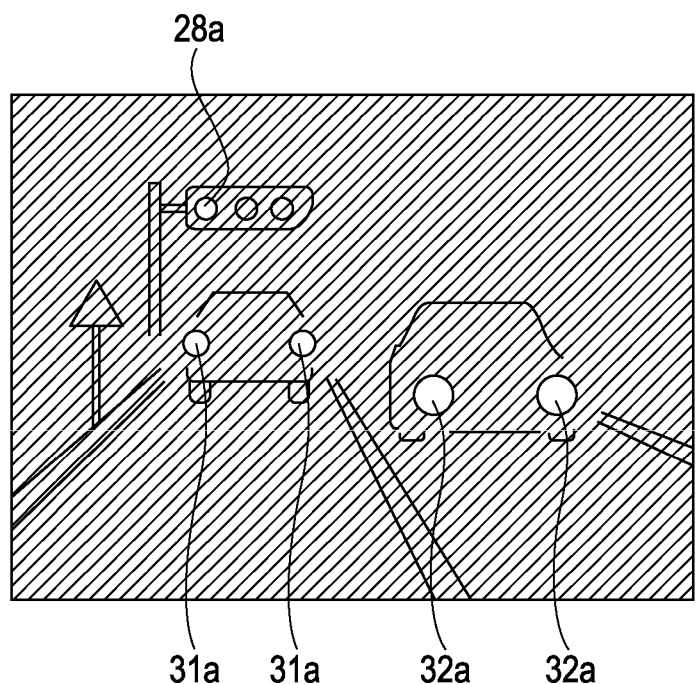
FIG. 5B is an explanatory view of an image captured with a high-luminance detection exposure amount.

On the other hand, as illustrated in FIG. 5B, when the exposure time is adjusted to be the high-luminance exposure amount (short exposure time), the recognition target by a reflection light cannot be stored, since it has low light intensity, but only the light sources 28a, 31a, and 32a that emit light are stored. The image recognition processor 12 compares a coordinate of the image of each of the light sources 28a, 31a, and 32a, and a coordinate of the recognition target captured with the low-luminance detection exposure, thereby determining to which recognition target each of the light sources 28a, 31a, and 32a belong, and measuring the distance between the vehicle 1 and each light source.

The light distribution controller 13 and the camera controller 14 start the control operation by turning ON an auto light switch 21 mounted to an instrument panel, a steering wheel, or a steering column. The light distribution controller 13 controls a light distribution (high beam or low beam) of the headlight 2 based upon the light distribution control signal from the image recognition processor 12. Specifically, when an unillustrated light relay switch is turned ON, the light distribution controller 13 controls the light distribution operation of the headlight 2 through an unillustrated drive circuit.

When it is determined that neither the vehicle ahead nor the oncoming vehicle is recognized from the image captured by the onboard camera 3, the headlight 2 is set as high beam, and when at least one of the vehicle ahead and the oncoming vehicle is recognized, it is set as low beam. When the driving environment during the travel at night is captured by the onboard camera 3, the headlight 2 is set as high beam, since the driving environment far ahead of the vehicle 1 can be captured with the high beam. However, when the headlight is set as high beam, a driver of the vehicle ahead or a driver of the oncoming vehicle might be dazzled. Accordingly, when the vehicle ahead or the oncoming vehicle is recognized, the headlight is set as low beam.

When the auto light switch 21 is turned ON, the camera controller 14 starts an operation (exposure operation) of adjusting the exposure amount of the main camera 3a and the sub-camera 3b based upon the exposure amount control signal from the image recognition processor 12. When the auto light switch 21 is turned OFF, the exposure amount is fixed to the low-luminance detection exposure amount.

Figure 2:
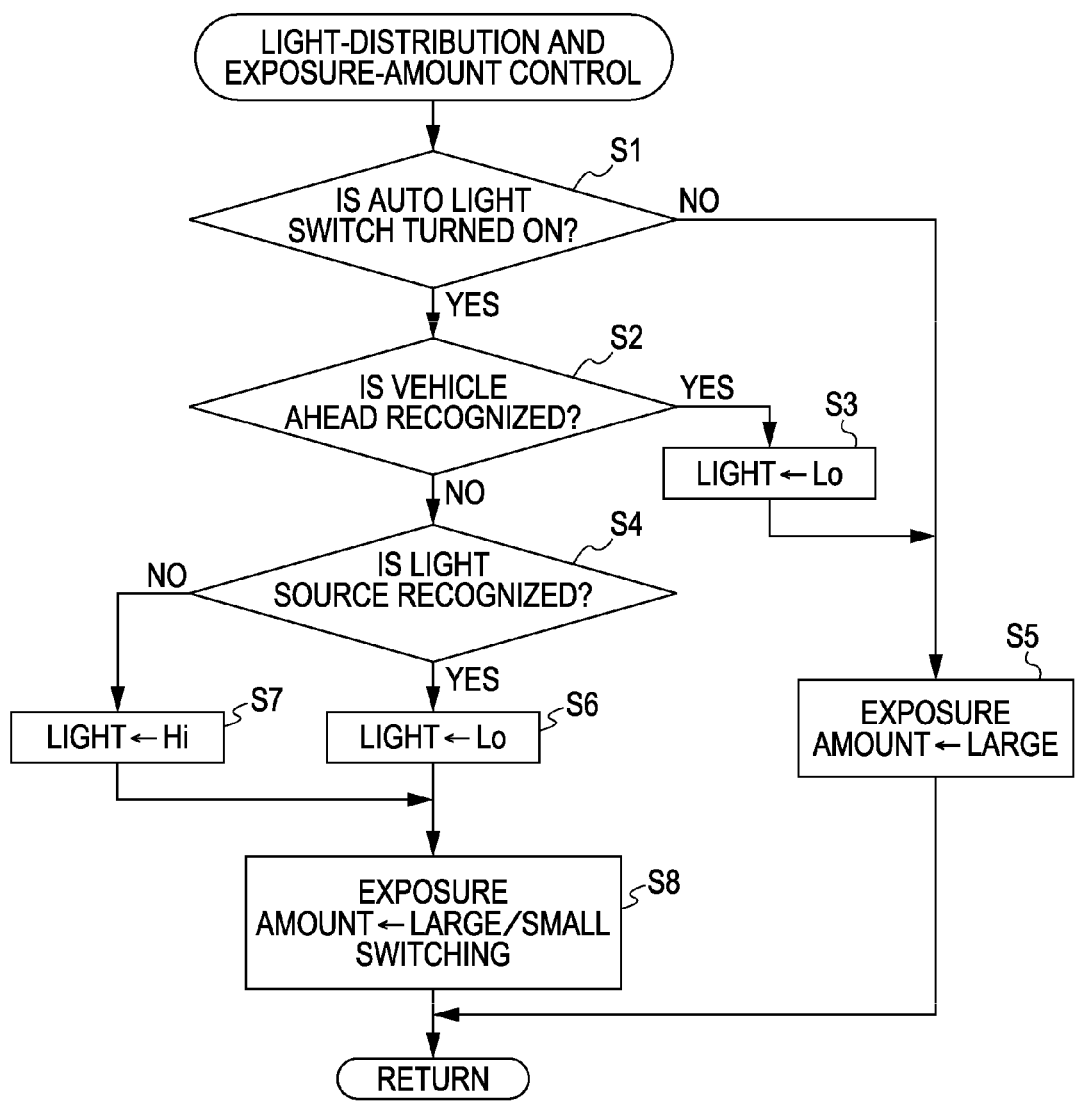
FIG. 2 is a flowchart illustrating a light-distribution and exposure-amount control routine.

Specifically, the light-distribution and exposure-amount control executed by the image recognition processor 12 is performed in accordance with a light-distribution and exposure-amount control routine illustrated in FIG. 2.

This routine is executed in synchronous with 1 frame of an image signal. In step S1, the image recognition processor 12 checks whether or not the auto light switch 21 is turned ON. When it is turned ON, the image recognition processor 12 proceeds to step S2 to execute the light-distribution and exposure-amount control. When the auto light switch 21 is turned OFF, the image recognition processor 12 proceeds to step S5 to set the mode to the second exposure mode in which the exposure amount is fixed to the low-luminance detection exposure amount (long exposure time), and then, exits the routine. When the auto light switch 21 is turned OFF, the driver manually turns ON or OFF the headlight 2.

Figure 3:
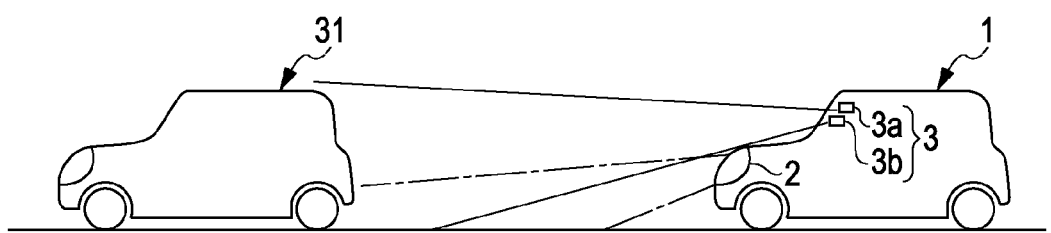
FIG. 3 is an explanatory view illustrating a light distribution control when a vehicle ahead is recognized.
Figure 4:
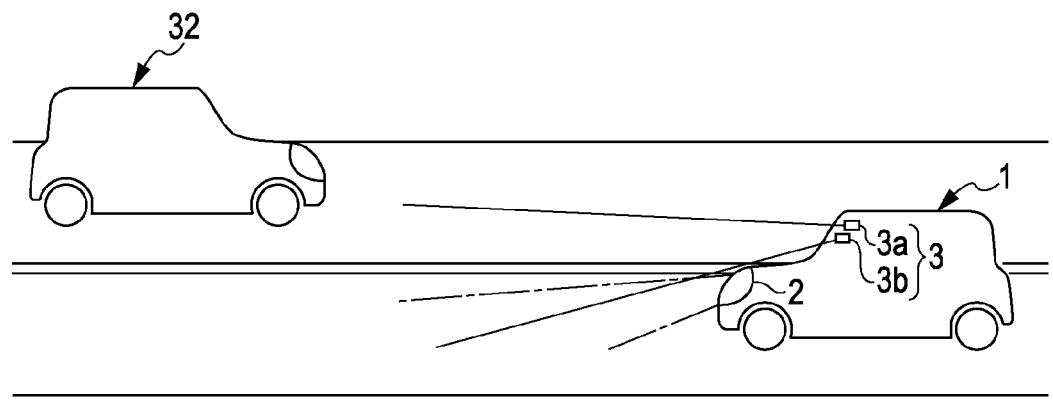
FIG. 4 is an explanatory view illustrating a light distribution control when an oncoming vehicle is recognized.

On the other hand, when proceeding to step S2, the image recognition processor 12 determines whether or not either one of the vehicle ahead 31 (see FIGS. 3, and 5A) running just in front of the vehicle 1 within a predetermined range (e.g., about 100 to 150 [m]) and the oncoming vehicle 32 (see FIGS. 4 and 5A) is recognized. When the vehicle ahead 31 is recognized, the image recognition processor 12 proceeds to step S3 to set the headlight 2 as low level (Lo), and then, proceeds to step S5. The image recognition processor 12 then adjusts the exposure time of both cameras 3a and 3b to the low-luminance detection exposure amount (long exposure time), and then, exits the routine.

On the other hand, when the vehicle ahead 31 is not recognized, the image recognition processor 12 proceeds to step S4 to check whether or not the light source (headlight 32a) of the oncoming vehicle 32 is recognized. When the light source of the oncoming vehicle 32 is recognized, the image recognition processor 12 proceeds to step S6 to set the headlight 2 as low beam, and then, proceeds to step S8. On the other hand, when the light source of the oncoming vehicle 32 is not recognized, the image recognition processor 12 proceeds to step S7 to set the headlight 2 as high beam, and then, proceeds to step S8.

When proceeding to step S8 from either one of step S6 and step S7, the image recognition processor 12 selects the first exposure amount mode. In the first exposure amount mode, the image recognition processor 12 outputs the exposure amount control signal to the camera controller 14 for switching the exposure time of the main camera 3a and the sub-camera 3b between the low-luminance detection exposure amount (long exposure time) and the high-luminance detection exposure amount (short exposure time) for each frame of the image signal, and then, exits the routine.

FIG. 6 illustrates the relationship between the light distribution of the headlight 2 and the exposure amount of the image sensor, which are set in the light-distribution and exposure-amount control routine according to the recognized state of the vehicle ahead 31 and the headlight 32a of the oncoming vehicle 32. As illustrated in this figure, when neither the vehicle ahead 31 nor the light source (headlight 32a) of the oncoming vehicle 32 is detected, the light distribution of the headlight 2 is set as high beam, and the exposure amount of the onboard camera 3 is alternately changed to the low-luminance detection exposure amount and the high-luminance detection exposure amount for each frame of the image signal.

When the vehicle ahead 31 is not detected, but the light source of the oncoming vehicle 32 is detected, the light distribution of the headlight 2 is set as low beam, and the exposure amount of the onboard camera 3 is alternately changed to the low-luminance detection exposure amount and the high-luminance detection exposure amount for each frame of the image signal, as in the above-mentioned case.

On the other hand, when the vehicle ahead 31 is detected, the light distribution of the headlight 2 is set as low beam, and the exposure amount of the onboard camera 3 is fixed to the low-luminance detection exposure amount (long exposure time). When the vehicle 1 detects the vehicle ahead 31, the exposure amount is fixed, so that the variation in the precision of recognizing the distance between the recognition target and the vehicle 1 can be suppressed, the variation being caused by changing the exposure amount for each frame.

In this case, the onboard camera 3 recognizes the vehicle just in front of the vehicle 1 from an image of the vehicle just in front of the vehicle 1, regardless of the magnitude of the exposure amount. Therefore, it is unnecessary to set the exposure amount as the high-luminance detection exposure amount for detecting the light source (taillight) of the vehicle ahead 32. Since the taillight 311 has lower luminance than the headlight 321, a great blooming does not occur even when the exposure amount is set as the low-luminance detection exposure amount.

Accordingly, when the vehicle ahead 32 is detected, the exposure amount is fixed to the low-luminance detection exposure amount (long exposure time), whereby the vehicle ahead 31 can precisely be recognized, and the distance between the vehicle 1 and the vehicle ahead 31 can precisely be obtained. As a result, the ACC control or the pre-crash control can be executed with high precision based upon this data even during the travel at night.

The present invention is not limited to the above-mentioned embodiment. For example, the headlight may be an LED headlight. The exposure amount of the onboard camera 3 is not limited to two types which are the high-luminance detection exposure amount and the low-luminance detection exposure amount, but may be three or more types.

What is claimed is:

1. A vehicle driving environment recognition apparatus mounted on a vehicle having a headlight, comprising:
    an onboard camera configured to capture an environment in front of the vehicle;
    an image recognition processing unit for acquiring an image captured by the onboard camera, detecting at least a vehicle ahead and a light source ahead, and setting a light distribution of the headlight and an exposure amount of the onboard camera according to whether the vehicle ahead is detected;
    a light distribution controlling unit for controlling the light distribution of the headlight based upon the light distribution set by the image recognition processing unit; and
    a camera controlling unit for adjusting the exposure amount of the onboard camera based upon the exposure amount set by the image recognition processing unit, wherein
    the image recognition processing unit
        determines whether the vehicle ahead and the light source ahead are detected in the captured image,
        when an auto light switch is turned on and when the vehicle ahead and the light source ahead are not detected, sets the light distribution of the headlight to be a high beam and selects a first exposure amount mode in which a low-luminance detection exposure amount and a high-luminance detection exposure amount are alternately set for each frame of an image signal,
        when the auto light switch is turned on and when the light source ahead is detected while the vehicle ahead is not detected, sets the light distribution of the headlight to be a low beam and selects the first exposure amount mode,
        when the auto light switch is turned on and when the vehicle ahead is detected, sets the light distribution of the headlight to be a low beam and selects a second exposure amount mode in which the exposure amount is fixed to a single exposure amount, and
        allows the camera controlling unit to expose with the selected one of the first and second exposure amount modes, and
    the light distribution controlling unit maintains the headlight to be on while the first and second exposure modes are being performed.

2. The vehicle driving environment recognition apparatus according to claim 1, wherein
    the second exposure amount mode is the low-luminance detection exposure amount.

3. The vehicle driving environment recognition apparatus according to claim 2, wherein
    the onboard camera includes an image sensor, and
    the exposure amount is set as an exposure time for the image sensor.

4. The vehicle driving environment recognition apparatus according to claim 1, wherein
    the onboard camera includes an image sensor, and
    the exposure amount is set as an exposure time for the image sensor.

5. A vehicle driving environment recognition apparatus mounted on a vehicle having a headlight, comprising:
    an onboard camera configured to capture an environment in front of the vehicle; and
    a processor, associated with the onboard camera, programmed to:
        obtain an image captured by the onboard camera, detect at least a vehicle ahead and a light source ahead, and set a light distribution of the headlight and an exposure amount value of the onboard camera according to whether the vehicle ahead is detected;
        control the headlight based upon the light distribution; and
        control the onboard camera to adjust the exposure amount based upon the exposure amount value, wherein
    the processor is further programmed to
        determine whether the vehicle ahead and the light source ahead are detected in the captured image,
        when an auto light switch is turned on and when the vehicle ahead and the light source ahead are not detected, set the light distribution of the headlight to be a high beam and select one of a first exposure amount mode in which a low-luminance detection exposure amount and a high-luminance detection exposure amount are alternately set for each frame of an image signal,
        when the auto light switch is turned on and when the light source ahead is detected while the vehicle ahead is not detected, set the light distribution of the headlight to be a low beam and select the first exposure amount mode,
        when the auto light switch is turned on and when the vehicle ahead is detected, set the light distribution of the headlight to be a low beam and select a second exposure amount mode in which the exposure amount is fixed to a single exposure amount,
        allow the camera controlling unit to expose with the selected one of the first and second exposure amount modes, and
        maintain the headlight to be on while the first and second exposure modes are being performed.

6. The vehicle driving environment recognition apparatus according to claim 5, wherein
    the second exposure amount mode is the low-luminance detection exposure amount.

7. The vehicle driving environment recognition apparatus according to claim 6, wherein
    the onboard camera includes an image sensor, and
    the exposure amount is set as an exposure time for the image sensor.

8. The vehicle driving environment recognition apparatus according to claim 5, wherein
    the onboard camera includes an image sensor, and
    the exposure amount is set as an exposure time for the image sensor.

* * * * *